United States Patent
Oh et al.

(10) Patent No.: US 12,191,450 B2
(45) Date of Patent: *Jan. 7, 2025

(54) ELECTROLYTE SOLUTION FOR SECONDARY BATTERY AND SECONDARY BATTERY INCLUDING THE SAME

(71) Applicant: SK ON CO., LTD., Seoul (KR)

(72) Inventors: Sung Yon Oh, Daejeon (KR); Sang Hye Shin, Daejeon (KR); Yu Na Shim, Daejeon (KR)

(73) Assignee: SK On Co., Ltd., Seoul (KR)

( * ) Notice: Subject to any disclaimer, the term of this patent is extended or adjusted under 35 U.S.C. 154(b) by 138 days.

This patent is subject to a terminal disclaimer.

(21) Appl. No.: 17/671,670

(22) Filed: Feb. 15, 2022

(65) Prior Publication Data

US 2023/0080189 A1    Mar. 16, 2023

(30) Foreign Application Priority Data

Aug. 24, 2021  (KR) ........................ 10-2021-0111903

(51) Int. Cl.
| | |
|---|---|
| *H01M 10/0567* | (2010.01) |
| *H01M 4/36* | (2006.01) |
| *H01M 4/38* | (2006.01) |
| *H01M 4/583* | (2010.01) |
| *H01M 4/587* | (2010.01) |
| *H01M 10/0525* | (2010.01) |
| *H01M 4/525* | (2010.01) |

(52) U.S. Cl.
CPC ....... *H01M 10/0567* (2013.01); *H01M 4/364* (2013.01); *H01M 4/366* (2013.01); *H01M 4/386* (2013.01); *H01M 4/583* (2013.01); *H01M 4/587* (2013.01); *H01M 10/0525* (2013.01); *H01M 4/525* (2013.01); *H01M 2300/0025* (2013.01)

(58) Field of Classification Search
None
See application file for complete search history.

(56) References Cited

U.S. PATENT DOCUMENTS

| | | |
|---|---|---|
| 2012/0315534 A1 | 12/2012 | Bhat et al. |
| 2013/0029217 A1 | 1/2013 | Bhat et al. |
| 2019/0363354 A1 | 11/2019 | Takano et al. |

FOREIGN PATENT DOCUMENTS

| | | | |
|---|---|---|---|
| CN | 111416153 A | | 7/2020 |
| JP | 2011-86548 | * | 4/2011 |
| JP | 201186548 A | | 4/2011 |
| KR | 1020140020328 A | | 2/2014 |
| KR | 1020190069573 A | | 6/2019 |

OTHER PUBLICATIONS

Brennan et al., "1-(3'-amino)propylsilatrane derivatives as covalent surface linkers to nanoparticulate metal oxide films for use in photoelectrochemical cells", Nanotechnology, 2009, pp. 1-10, vol. 20, No. 505203.

Broka et al., "Electrochemical oxidation of silatranes", J. Electroanal. Chem., 1993, pp. 199-206, vol. 351.

Lermontov et al., "1-Fluorosilatrane synthesis from SiF4 complexes and its properties" Journal of Organometallic Chemistry, 2009, pp. 2476-2479, vol. 694.

Mizumo et al., "Oligosiloxanes with Silatrane Moieties for Use in Lithium-ion Conductive Matrices", Silicon, 2017, pp. 85-96, vol. 9, No. 1.

Navarro-Suarez et al., "A silatrane: molecule-based crystal composite solid-state electrolyte for all solid-state lithium batteries", Batteries & Supercaps, 2019, 9 pages.

* cited by examiner

*Primary Examiner* — Laura Weiner
(74) *Attorney, Agent, or Firm* — The Webb Law Firm (57) ABSTRACT

An electrolyte solution for a secondary battery according to an exemplary embodiment includes a lithium salt, a non-aqueous organic solvent, and a silatrane-based compound represented by Chemical Formula 1. By including the electrolyte solution for a secondary battery according to an exemplary embodiment, a secondary battery can exhibit improved storage characteristics and improved capacity characteristics.

8 Claims, 2 Drawing Sheets

ELECTROLYTE SOLUTION FOR SECONDARY BATTERY AND SECONDARY BATTERY INCLUDING THE SAME

CROSS-REFERENCE TO RELATED APPLICATION

This application claims priority to Korean Patent Application No. 10-2021-0111903 filed Aug. 24, 2021, the disclosure of which is hereby incorporated by reference in its entirety.

BACKGROUND OF THE INVENTION

1. Field of the Invention

The present invention relates to an electrolyte solution for a secondary battery and a secondary battery including the same, and more specifically, to an electrolyte solution for a secondary battery, which includes an additive, and a secondary battery including the same.

2. Description of Related Art

Secondary batteries are batteries that can be repeatedly charged and discharged and have been widely applied to portable electronic communication devices such as camcorders, mobile phones, notebook PCs, and the like with the development of information communication and display industries. Examples of the secondary batteries include lithium secondary batteries, nickel-cadmium batteries, nickel-hydrogen batteries, and the like. Among them, the lithium secondary batteries have been actively developed and applied because they have high operating voltage and high energy density per unit weight and are advantageous in terms of charging rate and weight reduction.

The lithium secondary batteries may include, for example, an electrode assembly including a positive electrode, a negative electrode, and a separator and an electrolyte with which the electrode assembly is impregnated. The lithium secondary batteries may further include, for example, a pouch-type exterior material that accommodates the electrode assembly and the electrolyte.

For example, when charging and discharging are repeated, the active material particles included in the negative electrode or positive electrode may be in contact with the electrolyte to cause a side reaction, and mechanical and chemical damage, such as cracking of particles, may occur. When the composition and structure of the active material are changed to enhance the stability of active material particles, conductivity may be lowered, and thus the output of the secondary battery may be degraded.

Therefore, there is a demand for a general method capable of improving the lifespan stability and output/capacity characteristics of a secondary battery.

For example, Korean Unexamined Patent Publication No. 2019-0069573 discloses a negative electrode active material including silicon nanoparticles coated with a polysilsesquioxane and a lithium secondary battery including the same.

RELATED-ART DOCUMENTS

Patent Documents

Korean Unexamined Patent Publication No. 2019-0069573

SUMMARY OF THE INVENTION

The present invention is directed to providing an electrolyte solution for a secondary battery which exhibits enhanced stability and activity.

The present invention is also directed to providing a secondary battery which exhibits enhanced stability and activity.

An electrolyte solution for a secondary battery according to an exemplary embodiment includes a lithium salt, a non-aqueous organic solvent, and a silatrane-based compound.

In the electrolyte solution for a secondary battery according to an exemplary embodiment, the silatrane-based compound may be represented by Chemical Formula 1.

[Chemical Formula 1]

In Chemical Formula 1, each X includes an oxygen, sulfur, nitrogen, or phosphorus atom, $R_1$ is substituted with an electron donating group and may be any one of a $C_1$ to $C_{10}$ linear alkyl group, branched alkyl group, and cyclic alkyl group, and $R_2$, $R_3$, $R_4$, $R_5$, $R_6$, and $R_7$ may each be H or any one of a $C_1$ to $C_6$ linear alkyl group, branched alkyl group, and cyclic alkyl group.

In the electrolyte solution for a secondary battery according to an exemplary embodiment, $R_1$ may be substituted with an electron donating group and may be a $C_1$ to $C_5$ linear alkyl group or branched alkyl group, and $R_2$, $R_3$, $R_4$, $R_5$, $R_6$, and $R_7$ may each be H or a $C_1$ to $C_3$ linear alkyl group or branched alkyl group.

In the electrolyte solution for a secondary battery according to an exemplary embodiment, the silatrane-based compound may be represented by Chemical Formula 1-1.

[Chemical Formula 1-1]

In Chemical Formula 1-1, $R_1'$ is a $C_1$ to $C_5$ linear alkyl group or branched alkyl group, and Nu is a nucleophilic functional group.

In the electrolyte solution for a secondary battery according to an exemplary embodiment, the nucleophilic functional group may include one or more of a halogen group, a hydroxyl group, an alkoxy group, a primary to tertiary amine group, an imine group, a thiol group, a sulfide group, and a cyano group.

In the electrolyte solution for a secondary battery according to an exemplary embodiment, the silatrane-based compound may be included in an amount of 0.1 parts by weight to 5.0 parts by weight with respect to 100 parts by weight of the electrolyte solution for a secondary battery.

In the electrolyte solution for a secondary battery according to an exemplary embodiment, an additive including one or more compounds selected from the group consisting of a fluorine-containing carbonate-based compound, a vinylidene carbonate-based compound, and a sulfinyl group-containing compound may be further included.

In the electrolyte solution for a secondary battery according to an exemplary embodiment, the fluorine-containing carbonate-based compound may include fluoroethylene carbonate, the vinylidene carbonate-based compound may include vinylene carbonate, and the sulfinyl group-containing compound may include one or more of 1,3-propanesultone and ethylene sulfate.

In the electrolyte solution for a secondary battery according to an exemplary embodiment, the additive may be included in an amount of 0.1 parts by weight to 10 parts by weight with respect to 100 parts by weight of the electrolyte solution for a secondary battery.

In addition, a secondary battery according to an exemplary embodiment includes a positive electrode including lithium metal oxide, a negative electrode including one or more of a carbon-based active material and a silicon-based active material and disposed to face the positive electrode, and the electrolyte solution for a secondary battery according to an exemplary embodiment.

In the secondary battery according to an exemplary embodiment, the silatrane-based compound may be represented by Chemical Formula 1.

[Chemical Formula 1]

In Chemical Formula 1, each X includes an oxygen, sulfur, nitrogen, or phosphorus atom, $R_1$ is substituted with an electron donating group and may be any one of a $C_1$ to $C_{10}$ linear alkyl group, branched alkyl group, and cyclic alkyl group, and $R_2$, $R_3$, $R_4$, $R_5$, $R_6$, and $R_7$ may each be H or any one of a $C_1$ to $C_6$ linear alkyl group, branched alkyl group, and cyclic alkyl group.

In the secondary battery according to an exemplary embodiment, $R_1$ may be substituted with an electron donating group and may be a $C_1$ to $C_5$ linear alkyl group or branched alkyl group, and $R_2$, $R_3$, $R_4$, $R_5$, $R_6$, and $R_7$ may each be H or a $C_1$ to $C_3$ linear alkyl group or branched alkyl group.

In the secondary battery according to an exemplary embodiment, the silatrane-based compound may be included in an amount of 0.1 parts by weight to 5.0 parts by weight with respect to 100 parts by weight of the electrolyte solution for a secondary battery.

In the secondary battery according to an exemplary embodiment, the negative electrode includes a carbon-based active material and a silicon-based active material, and the silicon-based active material may be included in an amount of 0.1 parts by weight to 50 parts by weight with respect to 100 parts by weight of the carbon-based active material.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DESCRIPTION OF THE INVENTION

An electrolyte solution for a secondary battery according to an exemplary embodiment of the present invention includes a lithium salt, a non-aqueous organic solvent, and a silatrane-based compound. In the electrolyte solution for a secondary battery according to an exemplary embodiment, the silatrane-based compound may be represented by Chemical Formula 1.

[Chemical Formula 1]

In Chemical Formula 1, each X includes an oxygen, sulfur, nitrogen, or phosphorus atom, $R_1$ is substituted with an electron donating group and is any one of a $C_1$ to $C_{10}$ linear alkyl group, branched alkyl group, and cyclic alkyl group, and $R_2$, $R_3$, $R_4$, $R_5$, $R_6$, and $R_7$ are each H or any one of a $C_1$ to $C_6$ linear alkyl group, branched alkyl group, and cyclic alkyl group.

In addition, the present invention provides a secondary battery including the above-described electrolyte solution for a secondary battery. Since the secondary battery according to an exemplary embodiment includes the electrolyte solution for a secondary battery, the storage characteristics and capacity characteristics of the secondary battery can be improved.

In an exemplary embodiment, the silatrane-based compound represented by Chemical Formula 1 may form a coating layer on the surface of a negative electrode active material included in a negative electrode of the secondary battery. Since the coating layer is formed on the surface of a negative electrode active material, direct contact between the electrolyte solution and the negative electrode active material may be limited, and the volume change and loss of the negative electrode active material may be limited during a charging/discharging process of the secondary battery.

In an exemplary embodiment, a nitrogen atom included in Chemical Formula 1 may donate electrons to a silicon atom included in Chemical Formula 1, and a coordinate bond may be formed between the nitrogen atom and the silicon atom. Also, due to the coordinate bond formed between the nitrogen atom and the silicon atom, the silicon atom may partially have an anion.

In an exemplary embodiment, $R_1$ in Chemical Formula 1 may be an electron donating group. The electron donating group may donate electrons to the silicon through a resonance effect, an induction effect, and the like and may increase the partial negative charge of the nitrogen. As an example of the electron donating group, a hydroxyl group, an alkoxy group, a primary to tertiary amine group, a thiol group, a sulfide group, a vinyl group, a halide group such as a fluorine group, or the like may be provided.

In addition, as a preferred example of the electron donating group, a primary to tertiary amine group or a vinyl group may be provided. The electron donating group as $R_1$ may be bonded to the silicon atom to promote the dissociation of a Si—O bond. Furthermore, the formation of a coating layer derived from the silatrane-based compound may be further promoted, and high-temperature storage of the secondary battery according to an exemplary embodiment may be further enhanced.

In an exemplary embodiment, due to the partial negative charge of the silicon atom, the nucleophilicity of a single bond formed at the silicon atom may increase, and the reactivity between an electrophilic negative electrode active material and the single bond may increase.

Therefore, an electron pair constituting the single bond may be donated to form a chemical bond between the negative electrode active material and X in Chemical Formula 1. Furthermore, a coating layer derived from the silatrane-based compound may be formed on the surface of the negative electrode active material.

In addition, X in Chemical Formula 1 may have a negative charge due to the dissociation of the single bond, and X having a negative charge may function as a nucleophile. In an exemplary embodiment, a chemical bond may be formed between X having a negative charge and the negative electrode active material. The chemical bond may be a single bond such as Si—X and C—X.

In the electrolyte solution for a secondary battery according to an exemplary embodiment, the silatrane-based compound may be represented by Chemical Formula 1-1.

[Chemical Formula 1-1]

In Chemical Formula 1-1, $R_1'$ is a $C_1$ to $C_5$ linear or $C_3$ to $C_5$ branched alkyl group, and Nu is a nucleophilic functional group.

A nitrogen atom included in Chemical Formula 1-1 may form a coordinate bond together with a silicon atom included in Chemical Formula 1-1. Due to the coordinate bond formed between the nitrogen atom and the silicon atom, the silicon atom may partially have an anion. Furthermore, the single bond between the silicon atom and the oxygen atom may be dissociated to form an oxide.

In addition, the oxide derived from the compound of Chemical Formula 1-1 may react with a negative electrode active material to form a covalent bond. The covalent bond formed between the negative electrode active material and the oxide may be one or more of Si—O and C—O bonds. When a Si—O bond is formed, the bonding force of the coating layer formed on the surface of the negative electrode active material may be further enhanced due to the high affinity between silicon and oxygen.

In an exemplary embodiment, $R_1'$ in Chemical Formula 1-1 is a $C_1$ to $C_5$ linear alkyl group or a $C_1$ to $C_5$ branched alkyl group, and Nu is a nucleophilic functional group.

Preferably, $R_1'$ is a $C_1$ to $C_5$ linear alkyl group, and the nucleophilic functional group is one or more selected from among a halogen group, a hydroxyl group, an alkoxy group, a primary to tertiary amine group, an imine group, a thiol group, a sulfide group, and a cyano group.

When $R_1'$ satisfies the above-described number of carbon atoms, intramolecular substitution may occur between the nucleophilic functional group and the silicon atom. Also, due to the intramolecular substitution, the dissociation of the single bond between the silicon atom and the oxygen atom may be further promoted. For the same purpose, $R_1$ is preferably $C_1$ to $C_{10}$, more preferably $C_1$ to $C_5$, and most preferably $C_1$ to $C_4$.

In addition, $R_2$, $R_3$, $R_4$, $R_5$, $R_6$, and $R_7$ may each be H or any one of a $C_1$ to $C_6$ linear alkyl group, branched alkyl group, and cyclic alkyl group and are each preferably H or a $C_1$ to $C_3$ linear alkyl group or branched alkyl group.

In an exemplary embodiment, as described above, intramolecular substitution may occur due to the nucleophilic functional group included in Chemical Formula 1-1. Also, in an exemplary embodiment, the nucleophilic functional group may react with a negative electrode active material to additionally form a covalent bond.

In addition, since the nucleophilic functional group may form the covalent bond with the negative electrode active material, the silatrane-based compound may be induced to the surface of the negative electrode active material by the nucleophilic functional group. Furthermore, the nucleophilic functional group may primarily fix the silatrane-based compound on the surface of the negative electrode active material and may promote the formation of a coating layer on the surface of the negative electrode active material. As a result, the bonding force of the coating layer may be further enhanced.

In the electrolyte solution for a secondary battery according to an exemplary embodiment, the silatrane-based compound may be included in an amount of 0.1 parts by weight to 5.0 parts by weight with respect to 100 parts by weight of the electrolyte solution for a secondary battery. When the above-described range is satisfied, a coating layer derived from the silatrane-based compound can be uniformly formed while limiting the aggregation of the coating layer, and the lifespan characteristics of a secondary battery including the above-described electrolyte solution for a secondary battery can be enhanced.

In the electrolyte solution for a secondary battery according to an exemplary embodiment, an additive including one or more compounds selected from the group consisting of a fluorine-containing carbonate-based compound, a vinylidene carbonate-based compound, and a sulfinyl group (S=O)-containing compound may be further included.

In the electrolyte solution for a secondary battery according to an exemplary embodiment, an additive including vinyl ethylene carbonate (VEC) may be further included.

Since the electrolyte solution for a secondary battery according to an exemplary embodiment further includes the above-described additive, the high-temperature storage and high-temperature stability of a secondary battery including the electrolyte solution for a secondary battery can be further enhanced.

In an exemplary embodiment, the fluorine-containing carbonate-based compound may be fluoroethylene carbonate (FEC), difluoroethylene carbonate (DFEC), fluorodimethyl carbonate (FDMC), fluoroethyl methyl carbonate (FEMC), or a mixture thereof.

In an exemplary embodiment, the vinylidene carbonate-based compound may be vinylene carbonate (VC), or a mixture thereof.

In an exemplary embodiment, the sulfinyl group-containing compound may include one or more selected from the group consisting of a sulfone compound, a sulfite compound, a sulfonate compound, a sultone compound, and a sulfate compound.

In addition, as a non-limiting example of the sulfone compound, dimethyl sulfone, diethyl sulfone, ethyl methyl sulfone, methyl vinyl sulfone, divinyl sulfone, or a mixture thereof may be provided.

In addition, as a non-limiting example of the sulfite compound, ethylene sulfite, methyl ethylene sulfite, ethyl ethylene sulfite, 4,5-dimethyl ethylene sulfite, 4,5-diethyl ethylene sulfite, propylene sulfite, 4,5-dimethyl propylene sulfite, 4,5-diethyl propylene sulfite, 4,6-dimethyl propylene sulfite, 4,6-diethyl propylene sulfite, 1,3-butylene glycol sulfite, or a mixture thereof may be provided.

In addition, as a non-limiting example of the sulfonate compound, methyl methanesulfonate, ethyl methanesulfonate, methyl ethanesulfonate, propyl methanesulfonate, methyl propanesulfonate, ethyl propanesulfonate, vinyl methanesulfonate, allyl methanesulfonate, vinyl benzenesulfonate, allyl prop-2-enesulfonate, or a mixture thereof may be provided.

In addition, as a non-limiting example of the sultone compound, ethanesultone, 1,3-propanesultone (PS), 1,4-butanesultone, ethenesultone, 1,3-propenesultone, 3-fluoro-1,3-propanesultone, 1,4-butenesultone, or a mixture thereof may be provided.

In addition, as a non-limiting example of the sulfate compound, ethylene sulfate (ESA), propylene sulfate, 2,3-butylene sulfate, 1,3-propylene sulfate, 1,3-butylene sulfate, or a mixture thereof may be provided.

In the electrolyte solution for a secondary battery according to an exemplary embodiment, the fluorine-containing carbonate-based compound may include fluoroethylene carbonate, the vinylidene carbonate-based compound may include vinylene carbonate, and the sulfinyl group-containing compound may include one or more of 1,3-propanesultone and ethylene sulfate.

Since the electrolyte solution for a secondary battery according to an exemplary embodiment further includes the above-described additive, the high-temperature storage and high-temperature stability of a secondary battery including the electrolyte solution for a secondary battery can be further enhanced.

In the electrolyte solution for a secondary battery according to an exemplary embodiment, the additive may be included in an amount of 0.1 parts by weight to 10 parts by weight with respect to 100 parts by weight of the electrolyte solution for a secondary battery.

In an exemplary embodiment, when the additive is included in the above-described content range, the high-temperature stability and capacity retention rate of the secondary battery according to an exemplary embodiment can be improved, and the occurrence of rapid lifespan degradation and the like can be limited.

In the electrolyte solution for a secondary battery according to an exemplary embodiment, the electrolyte solution includes a lithium salt, which is an electrolyte, and a non-aqueous organic solvent. The lithium salt may be represented, for example, by $Li^+X^-$, and as the anion ($X^-$) of the lithium salt, $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, and the like may be exemplified.

In the electrolyte solution for a secondary battery according to an exemplary embodiment, the lithium salt may be included at a concentration of 0.1 to 2.0 M. When the above-described concentration range is satisfied, the conductivity of the electrolyte solution and the mobility of lithium ions can be uniformly ensured.

As the non-aqueous organic solvent, for example, propylene carbonate (PC), ethylene carbonate (EC), diethyl carbonate (DEC), dimethyl carbonate (DMC), ethyl methyl carbonate (EMC), methyl propyl carbonate, dipropyl carbonate, dimethyl sulfoxide, acetonitrile, dimethoxyethane, diethoxyethane, sulfolane, γ-butyrolactone, tetrahydrofuran, and the like may be used alone or in combination of two or more thereof.

In addition, a secondary battery according to an exemplary embodiment includes a positive electrode including lithium metal oxide, a negative electrode including one or more of a carbon-based active material and a silicon-based active material and disposed to face the positive electrode, and the electrolyte solution for a secondary battery according to an exemplary embodiment.

In the secondary battery according to an exemplary embodiment, the negative electrode includes a negative electrode active material capable of intercalating and deintercalating lithium ions.

In addition, in the secondary battery according to an exemplary embodiment, the negative electrode active material may include a carbon-based active material, a silicon-based active material, a lithium alloy, or a combination thereof.

In an exemplary embodiment, the carbon-based active material may include one or more selected from the group consisting of crystalline carbon, amorphous carbon, a carbon composite, and a carbon fiber.

As an example of the amorphous carbon, hard carbon, coke, a mesocarbon microbead (MCMB), a mesophase pitch-based carbon fiber (MPCF), or the like may be provided.

As an example of the crystalline carbon, graphite-based carbon such as natural graphite, artificial graphite, graphitized coke, a graphitized MCMB, a graphitized MPCF, and the like may be provided. As an element included in the lithium alloy, aluminum, zinc, bismuth, cadmium, antimony, silicon, lead, tin, gallium, indium, or the like may be provided.

In an exemplary embodiment, the negative electrode active material may include a silicon-based active material to achieve a high-capacity lithium secondary battery. The silicon-based active material may include a siloxane-based compound, and the siloxane-based compound may be represented by the chemical formula $SiO_X$ ($0<x<2$).

In addition, the siloxane-based compound may be a polymer compound and may be crystalline or amorphous. For example, a crystalline siloxane-based polymer compound may include one or more of an M-unit, a D-unit, and a T-unit.

The silicon-based active material may also include a silicon-carbon composite compound such as silicon carbide (SiC).

In addition, in the secondary battery according to an exemplary embodiment, the negative electrode includes a carbon-based active material and a silicon-based active material, and the silicon-based active material may be included in an amount of 0.1 parts by weight to 50 parts by weight with respect to 100 parts by weight of the carbon-based active material.

When the above-described content range is satisfied, a chemical bond between the silatrane-based compound and the silicon-based active material can be formed on a large scale to enhance the bonding force of the coating layer formed on the surface of the negative electrode active material, and the volume expansion of the negative electrode due to the silicon-based active material can be limited to uniformly improve the high-temperature storage and capacity characteristics of the secondary battery.

Hereinafter, exemplary embodiments of the present invention will be described in detail with reference to the accompanying drawings. However, this is merely exemplary, and the present invention is not limited to the specific embodiments described by way of example.

Figure 1:
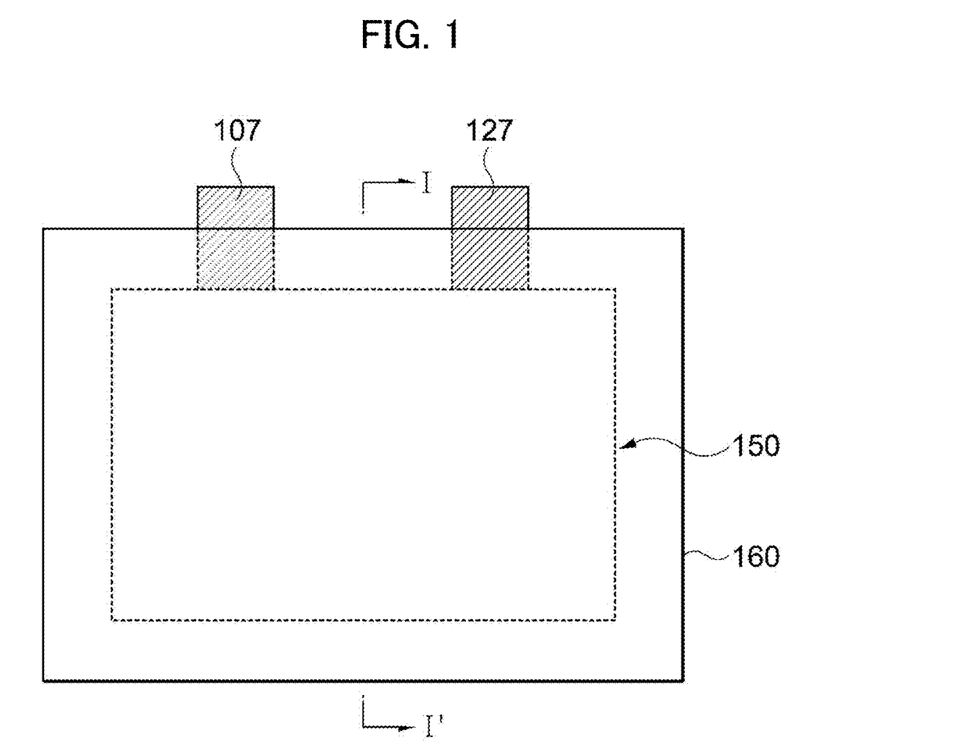
FIG. 1 is a schematic plan view of a secondary battery according to an exemplary example.
Figure 2:
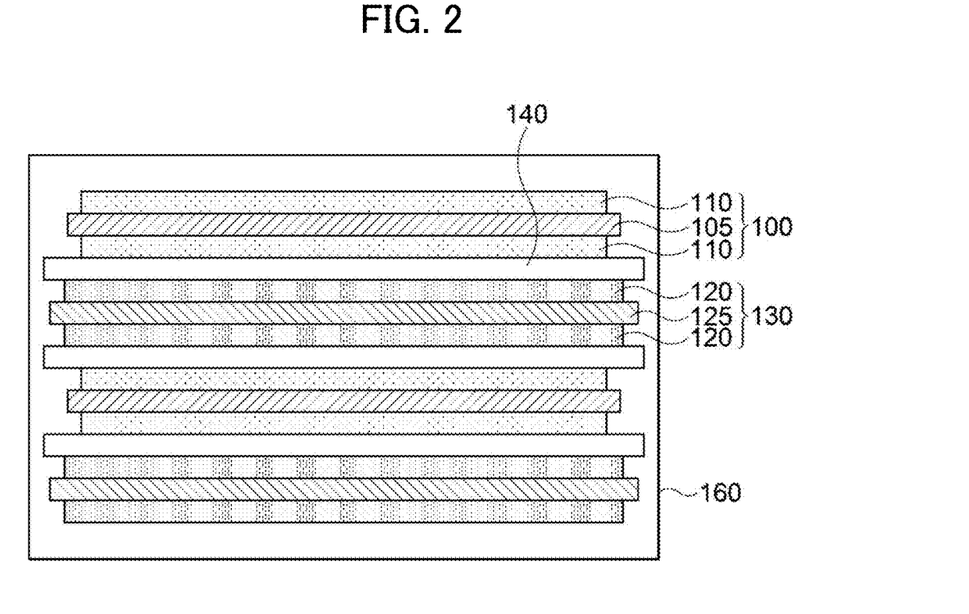
FIG. 2 is a schematic cross-sectional view of a secondary battery according to an exemplary example.

FIGS. 1 and 2 are the schematic plan view and cross-sectional view of secondary batteries according to exemplary embodiments, respectively. For example, FIG. 2 is a cross-sectional view taken along the line I-I' shown in FIG. 1 in the thickness direction of the lithium secondary battery.

Referring to FIGS. 1 and 2, the secondary battery may be provided as a lithium secondary battery. According to an exemplary embodiment, the secondary battery may include an electrode assembly 150 and a case 160 that accommodates the electrode assembly 150. The electrode assembly 150 may include a positive electrode 100, a negative electrode 130, and a separator 140.

The positive electrode 100 may include a positive electrode current collector 105 and a positive electrode active material layer 110 formed on at least one surface of the positive electrode current collector 105. According to an exemplary embodiment, the positive electrode active material layer 110 may be formed on both surfaces (e.g., upper surface and lower surface) of the positive electrode current collector 105. For example, the positive electrode active material layer 110 may be applied on each of the upper surface and lower surface of the positive electrode current collector 105 and may be directly applied on the surface of the positive electrode current collector 105.

The positive electrode current collector 105 may include, for example, stainless steel, nickel, aluminum, titanium, copper, or an alloy thereof and preferably includes aluminum or an aluminum alloy.

The positive electrode active material layer 110 includes lithium metal oxide as a positive electrode active material and may include a lithium (Li)-nickel (Ni)-based oxide according to an exemplary embodiment.

In an exemplary embodiment, the lithium metal oxide included in the positive electrode active material layer 110 may be represented by the following Chemical Formula 2.

[Chemical Formula 2]

In Chemical Formula 2, x may satisfy 0.9≤x≤1.1, y may satisfy 0≤y≤0.7, and z may satisfy −0.1≤z≤0.1. M may be one or more elements selected from the group consisting of Mg, Sr, Ba, B, Al, Si, Mn, Ti, Zr, and W, and X may be an element selected from O, F, S, and P.

Preferably, M in Chemical Formula 2 is manganese (Mn). In this case, a nickel-cobalt-manganese (NCM)-based lithium oxide may be used as the positive electrode active material.

For example, nickel (Ni) may be provided as a metal relating to the capacity of a lithium secondary battery. As a nickel content is increased, the capacity of a lithium secondary battery may be enhanced. However, when a nickel content is excessively increased, the lifespan may be degraded, and it may be disadvantageous in terms of mechanical and electrical stability.

In an exemplary embodiment, the molar fraction (1-y) of nickel in Chemical Formula 2 may range from 0.8 to 0.95. In this case, output and capacity may be increased due to a Ni-rich positive electrode composition.

For example, cobalt (Co) may be a metal relating to the conductivity or resistance and output of a lithium secondary battery. In an exemplary embodiment, M includes manganese (Mn), and Mn may be provided as a metal relating to the mechanical and electrical stability of a lithium secondary battery.

Capacity, output, low resistance, and lifespan stability may be enhanced by the positive electrode active material layer 110 through the above-described interaction among nickel, cobalt, and manganese.

In addition, the positive electrode active material layer 110 includes lithium metal oxide as a positive electrode active material, and the lithium metal oxide may be represented by Chemical Formula 3. The lithium metal oxide represented by Chemical Formula 3 may have an olivine structure.

[Chemical Formula 3]

In Chemical Formula 3, M is at least one element of Fe, Mn, Ni, Co, and V.

For example, the positive electrode active material may be mixed with a binder, a conductive material and/or a dispersing material in a solvent and stirred to prepare a slurry. The slurry may be applied onto a positive electrode current collector 105, then pressed, and dried to form a positive electrode active material layer 110.

The binder may include, for example, an organic binder such as a vinylidene fluoride-hexafluoropropylene copolymer (PVDF-co-HFP), polyvinylidene fluoride (PVDF), polyacrylonitrile, polymethyl methacrylate, or the like; or a water-based binder such as styrene-butadiene rubber (SBR) or the like, and may be used together with a thickener such as carboxymethyl cellulose (CMC).

For example, as the binder for forming a positive electrode, a PVDF-based binder may be used. In this case, the amount of positive electrode active material or lithium metal oxide particles may be relatively increased while reducing the amount of the binder for forming a positive electrode active material layer 110, and accordingly, the output and capacity of the secondary battery may be enhanced.

The conductive material may be included to promote electron movement between active material particles. For example, the conductive material may include a carbon-based conductive material such as graphite, carbon black, graphene, carbon nanotubes, or the like and/or a metal-based conductive material such as tin, tin oxide, titanium oxide, a perovskite material including $LaSrCoO_3$, $LaSrMnO_3$, or the like.

In an exemplary embodiment, the positive electrode 100 may have an electrode density of 3.0 to 3.9 g/cc, and preferably, 3.2 to 3.8 g/cc.

The negative electrode 130 may include a negative electrode current collector 125 and a negative electrode active material layer 120 formed on at least one surface of the negative electrode current collector 125. According to an exemplary embodiment, the negative electrode active material layer 120 may be formed on both surfaces (e.g., upper surface and lower surface) of the negative electrode current collector 125. The negative electrode active material layer 120 may be applied on each of the upper surface and lower surface of the negative electrode current collector 125. For example, the negative electrode active material layer 120 may be directly applied on the surface of the negative electrode current collector 125.

The negative electrode current collector 125 may include gold, stainless steel, nickel, aluminum, titanium, copper, or an alloy thereof and preferably includes copper or a copper alloy.

According to an exemplary embodiment, the negative electrode active material layer 120 may include the above-described negative electrode active material capable of intercalating and deintercalating lithium ions. As described above, as a preferred example of the negative electrode active material, one or more of a lithium alloy, a carbon-based active material, and a silicon (Si)-based active material may be provided.

For example, the negative electrode active material may be mixed with a binder, a conductive material and/or a dispersing material in a solvent and stirred to prepare a negative electrode slurry. The negative electrode slurry may be applied onto a negative electrode current collector 125, then pressed (roll-pressed), and dried to form a negative electrode active material layer 120.

As the binder and the conductive material, any binder and conductive material which are substantially the same as or similar to those used to form the positive electrode 100 may be used. In an exemplary embodiment, the binder for forming the negative electrode 130 may include, for example, styrene-butadiene rubber (SBR) or an acrylic binder for compatibility with a graphite-based active material, and may be used together with a thickener such as carboxymethyl cellulose (CMC).

In an exemplary embodiment, the negative electrode active material layer 120 may have a density of 1.4 to 1.9 g/cc.

In an exemplary embodiment, the surface area (e.g., contact area with the separator 140) and/or volume of the negative electrode 130 may be larger than those of the positive electrode 100. Accordingly, lithium ions generated from the positive electrode 100 smoothly move to the negative electrode 130 without being precipitated, and thus output and capacity characteristics may be further enhanced.

The separator 140 may be interposed between the positive electrode 100 and the negative electrode 130. The separator 140 may include a porous polymer film made of a polyolefin-based polymer such as an ethylene homopolymer, a propylene homopolymer, an ethylene/butene copolymer, an ethylene/hexene copolymer, an ethylene/methacrylate copolymer, or the like. The separator may also include a non-woven fabric made of high-melting-point glass fiber, polyethylene terephthalate fiber, or the like.

The separator 140 extends in the second direction between the positive electrode 100 and the negative electrode 130 and may be folded and wound along the thickness direction of the lithium secondary battery. Accordingly, a plurality of positive electrodes 100 and negative electrodes 130 may be laminated in the thickness direction through the separator 140.

According to an exemplary embodiment, an electrode cell is defined by the positive electrode 100, the negative electrode 130, and the separator 140, and a plurality of electrode cells may be laminated to form, for example, a jelly roll-type electrode assembly 150. For example, the electrode assembly 150 may be formed through the winding, lamination, folding, and the like of the separator 140.

The electrode assembly 150 is accommodated in the case 160, and an electrolyte may be injected inside the case 160. The case 160 may include, for example, a pouch, a can, or the like.

As shown in FIG. 1, electrode tabs (positive electrode tab and negative electrode tab) may protrude from the positive electrode current collector 105 and the negative electrode current collector 125 included in each electrode cell and extend to one side of the exterior case 160. The electrode tabs may be fused together with the one side of the exterior case 160 to be connected to electrode leads (positive electrode lead 107 and negative electrode lead 127) that are extended or exposed to the outside of the exterior case 160.

Although the positive electrode lead 107 and the negative electrode lead 127 are illustrated as being formed on the same side of the lithium secondary battery or exterior case 160 in FIG. 1, they may be formed on opposite sides.

For example, the positive electrode lead 107 may be formed on one side of the exterior case 160, and the negative electrode lead 127 may be formed on the other side of the exterior case 160.

The lithium secondary battery may be produced, for example, in a cylindrical type using a can, a prismatic type, a pouch type, a coin type, or the like.

Hereinafter, experimental examples including specific examples and comparative examples will be described in order to aid in understanding the present invention. However, it is apparent to those skilled in the art that the description proposed herein is just a preferable example for the purpose of illustration only, and is not intended to limit the appended claims. Therefore, it should be understood that various changes and modifications can be made to the examples of the present invention without departing from the scope and technical spirit of the present invention, so that the present invention covers all such changes and modifications provided they are within the scope of the appended claims and their equivalents.

PREPARATION EXAMPLE 1

Ethyl acetate (150 mL) as a solvent, triethanolamine (13.7 g, 92 mmol), and a tetramethylammonium hydroxide 25% methanol solution (0.50 g, 1 mmol) were input into a 250 mL round-bottom flask to prepare a solution. (2-Cyanoethyl) triethoxysilane (20 g, 92 mmol) was added to the solution, and a temperature was raised to about 60° C. while stirring.

After the temperature elevation, the resulting solution was stirred for 12 hours or more and cooled to room temperature to produce a white solid, and the white solid was filtered, washed, and dried to obtain 17.8 g of (2-cyanoethyl)silatrane in the form of a solid. (yield: 84%), 1H NMR(500 MHz, CDCl$_3$) δ=3.76(6H, t), 2.82(6H, t), 2.36(2H, t), 0.74(2H, t)

PREPARATION EXAMPLE 2

Toluene (100 mL) as a solvent, triethanolamine (14.32 g, 96 mmol), and a tetramethylammonium hydroxide 25% methanol solution (0.17 g, 5 mmol) were input into a 250 mL round-bottom flask to prepare a solution. Tetraethyl orthosilicate (20 g, 9 6 mmol) and ammonium fluoride (3.38 g, 91 mmol) were added to the solution, and a condenser and Dean-Stark glassware were installed.

The resulting solution was stirred at 95° C. for 12 hours or more, cooled to room temperature, then filtered, and washed to obtain a white solid. The white solid was re-dissolved in acetonitrile and filtered to remove an ammonium salt, and the filtrate was dried to obtain 11.8 g of fluorosilatrane in the form of a solid. (yield: 63%), 1H-NMR (500 MHz, CDCl$_3$) δ=3.90(6H, t), 2.95(6H, t)

PREPARATION EXAMPLE 3

Ethanol (50 mL) as a solvent, triethanolamine (3.9 g, 26 mmol), and a tetramethylammonium hydroxide 25% methanol solution (0.38 g, 1 mmol) were input into a 250 mL round-bottom flask to prepare a solution. Triethoxyvinylsilane (5 g, 26 mmol) was added to the solution, and a temperature was raised to about 75° C. while stirring.

After the temperature elevation, the resulting solution was stirred for 12 hours or more and cooled to room temperature to produce a white solid, and the white solid was filtered, washed, and dried to obtain 3.6 g of vinylsilatrane in the form of a solid. (yield: 68%), 1H NMR(500 MHz, CDCl$_3$) δ=5.99(1H, q), 5.80(2H, m), 3.82(6H, t), 2.86(6H, t)

EXAMPLE 1

The silatrane-based compound ((2-cyanoethyl)silatrane) obtained in Preparation Example 1, a non-aqueous solvent mixture, and a lithium salt were mixed to obtain an electrolyte solution for a secondary battery. The solvent mixture included 25 parts by weight of EC and 75 parts by weight of EMC, and the lithium salt was LiPF$_6$ and had a concentration of 1.0 M. Also, the silatrane-based compound was included in an amount of 1 part by weight with respect to 100 parts by weight of the solvent mixture.

LiNi$_{0.6}$Co$_{0.2}$Mn$_{0.2}$O$_2$ as a positive electrode active material, polyvinylidene fluoride (PVdF) as a binder, and carbon as a conductive material were mixed in a weight ratio of 92:4:4, and then the mixture was dispersed in N-methyl-2-pyrrolidone to prepare a positive electrode slurry. The slurry was applied onto a 20 μm-thick aluminum foil, then dried, and roll-pressed to produce a positive electrode.

Artificial graphite as a negative electrode active material, styrene-butadiene rubber (SBR) as a binder, and carboxymethyl cellulose (CMC) as a thickener were mixed in a weight ratio of 96:2:2, and then the mixture was dispersed in water to prepare a negative electrode slurry. The slurry was applied onto a 15 μm-thick copper foil, then dried, and roll-pressed to produce a negative electrode.

A 25 μm-thick polyethylene (PE) film separator was stacked between the produced electrodes to form a cell using a pouch with a size of 8 mm (thickness)×60 mm (width)×90 mm (length), and the electrolyte solution for a secondary battery was injected thereinto, thereby producing a 2.0 Ah secondary battery.

EXAMPLE 2

A secondary battery was produced in the same manner as in Example 1, except that mixed particles prepared by mixing 95 parts by weight of artificial graphite and 5 parts by weight of SiO$_2$ particles were used as a negative electrode active material, the mixed particles, SBR as a binder, and CMC as a thickener were mixed in a weight ratio of 96:2:2, then the mixture was dispersed in water to prepare a negative electrode slurry, and the slurry was applied onto a 15 μm-thick copper foil, then dried, and roll-pressed to produce a negative electrode.

EXAMPLES 3 to 6

Lithium secondary batteries were produced in the same manner as in Example 2, except that the content of the silatrane-based compound of Preparation Example 1 relative to 100 parts by weight of a solvent mixture varied, and the specific content of SiO$_2$ particles relative to 100 parts by weight of mixed particles and the specific content of additive relative to 100 parts by weight of the electrolyte solution for a secondary battery are as shown in Table 1 below. The unit of contents shown in Table 1 below is parts by weight.

EXAMPLES 7 TO 10

Lithium secondary batteries were produced in the same manner as in Example 2, except that the content of SiO$_2$ particles relative to 100 parts by weight of mixed particles varied. The specific content for each component is as shown in Table 1 below.

EXAMPLES 11 AND 12

Lithium secondary batteries were produced in the same manner as in Example 2, except that the silatrane-based compound of Preparation Example 2 (Example 11) or the silatrane-based compound of Preparation Example 3 (Example 12) was used instead of the silatrane-based compound of Preparation Example 1. The specific content for each component is as shown in Table 1 below.

TABLE 1

| | | Silatrane-based compound | SiO$_2$ | FEC | PS | ESA | LiPO$_2$F$_2$ |
|---|---|---|---|---|---|---|---|
| Examples | 1 | Preparation Example 1 1.0 | — | 1.0 | 0.5 | 0.5 | 1.0 |
| | 2 | Preparation Example 1 1.0 | 5.0 | | | | |
| | 3 | Preparation Example 1 0.5 | 5.0 | | | | |
| | 4 | Preparation Example 1 1.5 | 5.0 | | | | |
| | 5 | Preparation Example 1 3.0 | 5.0 | | | | |
| | 6 | Preparation Example 1 5.0 | 5.0 | | | | |
| | 7 | Preparation Example 1 1.0 | 1.0 | | | | |
| | 8 | Preparation Example 1 1.0 | 3.0 | | | | |
| | 9 | Preparation Example 1 1.0 | 8.0 | | | | |
| | 10 | Preparation Example 1 1.0 | 10.0 | | | | |
| | 11 | Preparation Example 2 1.0 | 5.0 | 2.0 | | | |
| | 12 | Preparation Example 3 1.0 | 5.0 | | | | |

(units: parts by weight)

1) Fluoroethylene carbonate (FEC) included in each example is commercially available from HSC Corporation.

2) Propane sultone (PS) included in each example is commercially available from PineStone 3) Ethylene sulfate (ESA) included in each example is commercially available from SUNTEC 4) LiPO$_2$F$_2$ included in each example is commercially available from Chunbo Fine Chem Co., Ltd.

COMPARATIVE EXAMPLE 1

A lithium secondary battery was produced in the same manner as in Example 1, except that (2-cyanoethyl)silatrane was not added to an electrolyte solution for a secondary battery.

COMPARATIVE EXAMPLE 2

A lithium secondary battery was produced in the same manner as in Example 2, except that (2-cyanoethyl)silatrane was not added to an electrolyte solution for a secondary battery.

COMPARATIVE EXAMPLE 3

A lithium secondary battery was produced in the same manner as in Example 1, except that triethanolamine was included instead of (2-cyanoethyl)silatrane in an electrolyte solution for a secondary battery. In the electrolyte solution for a secondary battery, triethanolamine was included in an amount of 1.5 parts by weight with respect to 100 parts by weight of a solvent mixture.

EXPERIMENTAL EXAMPLES

1. Analysis of Scanning Electron Microscope (SEM) Image

Figure 3:
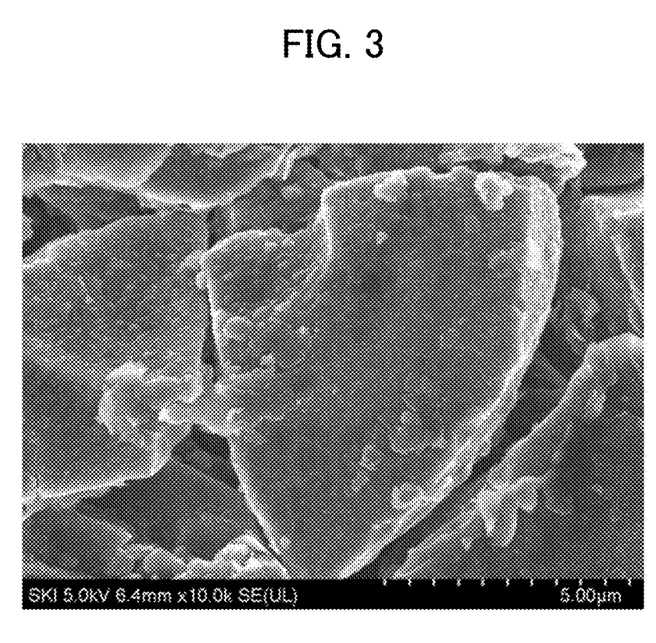
FIGS. 3 and 4 are scanning electron microscope (SEM) images of negative electrode active material surfaces according to an exemplary example and comparative example, respectively.
Figure 4:
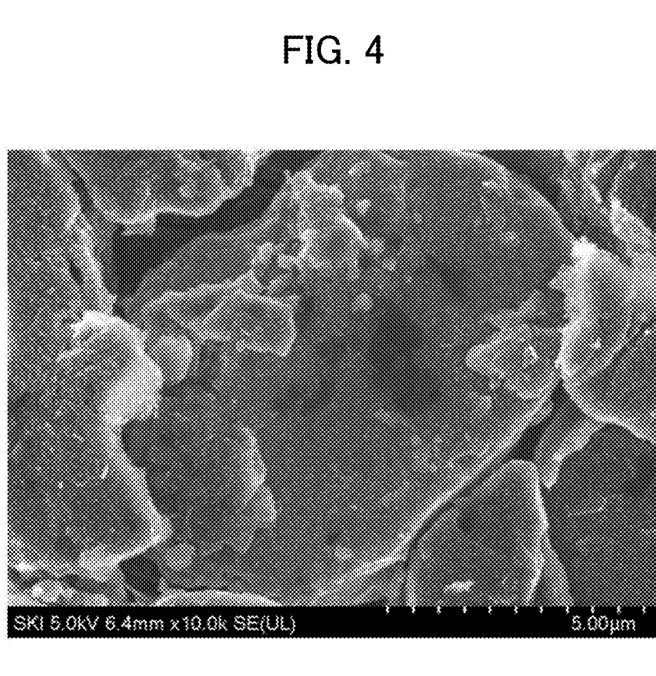

FIGS. 3 and 4 are SEM images of negative electrode active material surfaces according to an exemplary example and comparative example, respectively. The SEM image of FIG. 3 was taken of the surface of a negative electrode active material included in the secondary battery of Example 2, and the SEM image of FIG. 4 was taken of the surface of a negative electrode active material included in the secondary battery of Comparative Example 2.

Referring to FIG. 3, it can be confirmed that a coating layer was formed on the surface of negative electrode active material particles and a boundary line was formed on the coating layer due to a change in thickness of the coating layer. On the other hand, referring to FIG. 4, it can be confirmed that a coating layer was not formed on the surface of negative electrode active material particles.

2. Evaluation of Thickness Increase Rate According to High-Temperature Storage

Each of the secondary batteries according to Examples and Comparative Examples was charged at room temperature at 1C rate CC-CV (4.2 V, 0.05C cut-off) and then stored in a 60° C. oven for 10 weeks. After taking the battery out of the oven and measuring the thickness of the center using a thickness gauge in a hot state, the resulting thickness was divided by initial thickness before storage at 60° C. to calculate a thickness increase rate. The thickness increase rate calculated by (Thickness after 10 weeks/Initial thickness)*100 (%) is shown in Table 2 below. The initial thickness of the secondary batteries according to Examples and Comparative Examples was the same (5.56 mm), and decimal points are rounded down.

3. Evaluation of Capacity Characteristics According to High-Temperature Storage

Each of the secondary batteries according to Examples and Comparative Examples was charged at room temperature at 1C rate CC-CV (4.2 V, 0.05C cut-off) and then stored in a 60° C. oven for 10 weeks. Afterward, each secondary battery was taken out of the oven, allowed to stand for 30 minutes, and discharged at 1C rate CC (2.7V cut-off) to measure capacity, and the measured capacity was divided by the initially measured capacity to calculate a capacity retention rate (%). Also, the capacity usable after high-temperature storage was divided by the initially measured capacity to calculate a capacity recovery rate (high-temperature storage efficiency, %). A result of evaluating the capacity retention rate and capacity recovery rate of the secondary batteries according to Examples and Comparative Examples is shown in the following Table 2. Decimal points are rounded down.

TABLE 2

|  |  | Evaluation items | | |
|---|---|---|---|---|
|  |  | Thickness increase rate | Capacity retention rate | Capacity recovery rate |
| Examples | 1 | 119 | 83 | 86 |
|  | 2 | 136 | 72 | 74 |
|  | 3 | 140 | 71 | 70 |
|  | 4 | 134 | 74 | 75 |
|  | 5 | 131 | 76 | 79 |
|  | 6 | 133 | 73 | 76 |
|  | 7 | 124 | 81 | 83 |
|  | 8 | 134 | 75 | 78 |
|  | 9 | 153 | 72 | 73 |
|  | 10 | 159 | 69 | 70 |
|  | 11 | 139 | 70 | 73 |
|  | 12 | 131 | 73 | 73 |
| Comparative | 1 | 128 | 77 | 79 |
| Examples | 2 | 151 | 69 | 71 |
|  | 3 | 148 | 69 | 70 |

Referring to Table 2, it can be confirmed that the thickness change of the secondary batteries according to Examples 1 and 2 was less than that of the secondary batteries according to Comparative Examples 1 and 2. Also, even after high-temperature storage, the thickness change of the secondary batteries according to Examples 3 to 8 was found to be 140% or less.

Referring to Table 2, it can be confirmed that the capacity retention rate and capacity recovery rate of the secondary battery according to Example 1 were enhanced as compared to those of the secondary battery according to Comparative Example 1. Likewise, it can be confirmed that the capacity retention rate and capacity recovery rate of the secondary battery according to Example 2 were enhanced as compared to those of the secondary battery according to Comparative Example 2.

Referring to the results of evaluating Comparative Examples 1 and 2 and Examples 1 and 2, it can be inferred that, since (2-cyanoethyl)silatrane according to Preparation Example 1 is included in an electrolyte solution, both of the capacity retention rate and capacity recovery rate of a negative electrode including a silicon-based active material and a negative electrode not including a silicon-based active material are improved.

Referring to Table 2, in the case of the secondary batteries according to Examples 3 to 10, it can be confirmed that at least one of a capacity retention rate and a capacity recovery rate exceeded 70%.

In addition, the high-temperature storage of a secondary battery can be differently evaluated according to the type of functional group included in a silatrane-based compound.

For example, the secondary battery of Example 11 was evaluated as having a higher thickness increase rate, a lower capacity retention rate, and a lower capacity recovery rate than those of the secondary battery of Example 2. It can be determined that an electronegative fluorine group is bonded to a silicon atom, and thus the dissociation of a Si—O bond is relatively delayed.

On the other hand, the secondary battery of Example 12 was evaluated as having a lower thickness increase rate and a higher capacity retention rate than those of the secondary battery of Example 2. It can be determined that a vinyl group is bonded to a silicon atom, and thus the dissociation of a Si—O bond is relatively promoted.

However, both of the secondary batteries according to Examples 11 and 12 were evaluated as having lower thickness increase rates, higher capacity retention rates, and higher capacity recovery rates than those of the secondary battery according to Comparative Example 2.

Therefore, due to the inclusion of the electrolyte solution for a secondary battery which includes the silatrane-based compound, the high-temperature storage and capacity characteristics of a negative electrode can be enhanced, and furthermore, the high-temperature storage and capacity characteristics of a secondary battery can be enhanced.

According to an exemplary embodiment, an electrolyte solution for a secondary battery can be prepared to include a lithium salt, a non-aqueous organic solvent, and a silatrane-based compound. The electrolyte solution for a secondary battery, which includes the silatrane-based compound, can improve the storage characteristics and capacity characteristics of a negative electrode.

According to an exemplary embodiment, the silatrane-based compound included in the electrolyte solution for a secondary battery can form a coating layer on the surface of a negative electrode for a secondary battery. Also, the silatrane-based compound can form a coating layer on the surface of a negative electrode active material included in the negative electrode.

According to an exemplary embodiment, the coating layer formed on the surface can reduce the exposure of a negative electrode active material to the electrolyte solution. Furthermore, the coating layer formed on the surface of a negative electrode active material can limit the contact between a positive electrode active material and a negative electrode active material dissolved in the electrolyte solution.

In addition, according to an exemplary embodiment, a chemical bond can be formed between the silatrane-based compound included in the electrolyte solution for a secondary battery and a negative electrode active material. Due to the chemical bond and the silatrane-based compound, the coating layer formed on the surface of a negative electrode active material can be maintained even at high temperature, and high-temperature storage of the negative electrode active material can be enhanced.

According to an exemplary embodiment, a secondary battery including the electrolyte solution for a secondary battery which includes the silatrane-based compound can exhibit enhanced capacity characteristics, enhanced storage characteristics, and enhanced high-temperature storage.

LIST OF REFERENCE NUMERALS

100: positive electrode
105: positive electrode current collector
110: positive electrode active material layer
120: negative electrode active material layer
125: negative electrode current collector
130: negative electrode
140: separator
150: electrode assembly
160: case

What is claimed is:
1. An electrolyte solution for a secondary battery comprising a lithium salt, a non-aqueous organic solvent, and a silatrane-based compound represented by Chemical Formula 1:

[Chemical Formula 1]

wherein, in Chemical Formula 1, each X includes an oxygen, sulfur, nitrogen or phosphorus atom and Xs are same, $R_1$ is an electron donating group, $C_1$ to $C_{10}$ linear alkyl group substituted with an electron donating group, $C_3$ to $C_{10}$ branched alkyl group substituted with an electron donating group, $C_3$ to $C_{10}$ cyclic alkyl group substituted with an electron donating group, or $-R_1'-$Nu, the electron donating group includes one or more of a hydroxyl group, an alkoxy group, a primary to tertiary amine group, a thiol group, a sulfide group, a vinyl group and a halide group, $R_1'$ is a $C_1$ to $C_5$ linear alkyl group or branched alkyl group, and Nu is an imine group or a cyano group; and $R_2$, $R_3$, $R_4$, $R_5$, $R_6$, and $R_7$ are selected from a group consisting of H, a $C_1$ to $C_6$ linear alkyl group, branched alkyl group, and cyclic alkyl group, wherein the silatrane-based compound is included in an amount of 0.1 parts by weight to 5.0 parts by weight with respect to 100 parts by weight of the electrolyte solution for a secondary battery.

2. The electrolyte solution of claim 1, further comprising an additive comprising one or more compounds selected from the group consisting of a fluorine-containing carbonate-based compound, a vinylidene carbonate-based compound, and a sulfinyl group-containing compound, and wherein the additive is included in an amount of 0.1 parts by weight to 10 parts by weight with respect to 100 parts by weight of the electrolyte solution for a secondary battery.

3. The electrolyte solution of claim 2, wherein the fluorine-containing carbonate-based compound comprises fluoroethylene carbonate, the vinylidene carbonate-based compound comprises vinylene carbonate, and the sulfinyl group-containing compound is at least one selected from a group consisting of 1,3-propanesultone and ethylene sulfate.

4. A secondary battery comprising:
a positive electrode comprising lithium metal oxide;
a negative electrode comprising one or more of a carbon-based active material and a silicon-based active material and disposed to face the positive electrode; and
the electrolyte solution for a secondary battery according to claim 1.

5. The secondary battery of claim 4, wherein the negative electrode comprises a carbon-based active material and a silicon-based active material, and the silicon-based active material is comprised of an amount of 0.1 parts by weight to 50 parts by weight with respect to 100 parts by weight of the carbon-based active material.

6. The secondary battery of claim 4, wherein when the secondary battery is charged, a coating layer comprising the silatrane-based compound is formed on a surface of the active material in the negative electrode.

7. The secondary battery of claim 6, wherein a C—O bond is formed between the carbon-based active material and the silatrane-based compound in which Xs are oxygens.

8. The secondary battery of claim 6, wherein a Si—O bond is formed between the silicon-based active material and the silatrane-based compound in which Xs are oxygens.

* * * * *